(No Model.)

R. KLOSS.
ROLLING COLTER.

No. 264,307.  Patented Sept. 12, 1882.

Attest
J. Björnsen
P. H. Staley

Inventor
Robert Kloss

BY
H. Harrison
Attorney

UNITED STATES PATENT OFFICE.

ROBERT KLOSS, OF SHABONIER, ILLINOIS.

ROLLING COLTER.

SPECIFICATION forming part of Letters Patent No. 264,307, dated September 12, 1882.

Application filed May 27, 1882. (No model.)

*To all whom it may concern:*

Be it known that I, ROBERT KLOSS, a citizen of the United States of America, residing at Shabonier, in the county of Fayette and State of Illinois, have invented certain new and useful Improvements in Rolling Colters, of which the following is a specification.

My invention relates to improvements in rolling colters.

The object of my invention is to provide a rolling colter for plows, which shall be simple and cheap in construction, and so constructed and arranged that the working parts are completely inclosed, preventing dirt or weeds from getting in the bearings.

My invention consists in certain combinations of parts, as hereinafter set forth with reference to the accompanying drawings, in which—

Figure 1:
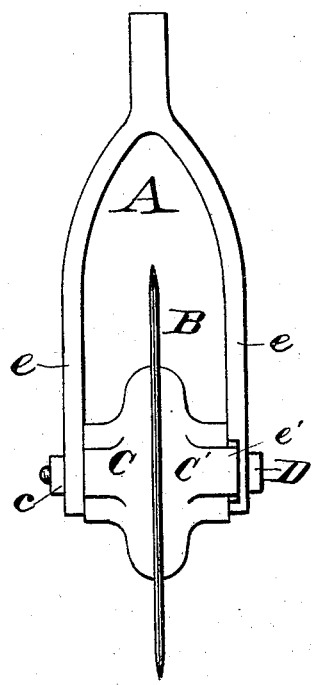
Figure 2:
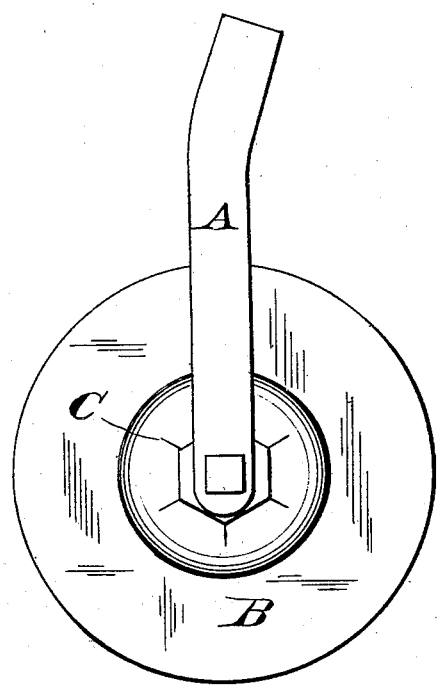
Figure 3:
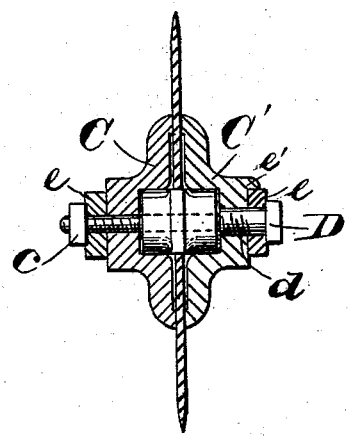
Figure 4:
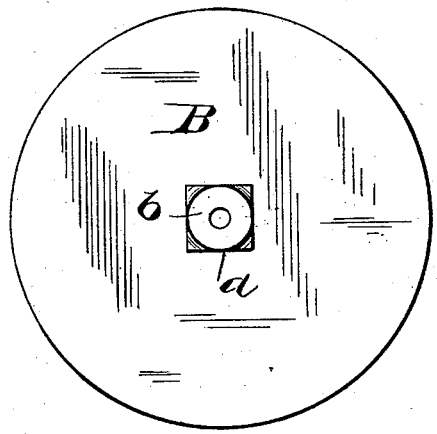

Figure 1 is a front elevation, Fig. 2 a side elevation, Fig. 3 a sectional elevation, of my improved colter. Fig. 4 is a view of the cutter removed.

Similar letters of reference refer to similar parts throughout the several views.

In the said drawings, A represents the yoke or frame of the colter, which may be made of any suitable shape and material, and secured to the plow in any appropriate manner.

B is the cutter, which is made of steel in the ordinary manner, and is provided at the center with a square hole, $a$, in which is fitted a hub, $b$. (See Fig. 3.) This hub I prefer to make of hard wood; but it may be made of any suitable metal. It is made square in the middle, but is reduced at the ends, and projects into the disks C C', placed at either side of the cutter B. These disks C C' are made of iron, and have a bearing around their outer edge against the face of the cutter B.

D is a bolt, which passes through the sides $e\ e$ of the yoke A, disks C and C' and hub, and is provided at one end with a nut, $c$. The bolt D at the part $d$ is enlarged, and is screw-threaded and screws into the disk C', which has a projection, $e'$, extending over the side $e$ of the yoke A, to prevent said disk from turning. When the bolt D passes through the hub $b$ it is left plain, but is provided with threads at the other reduced end, on which screws the disk C, and it projects through the other side, $e$, of the yoke A and is supplied with the nut $c$. By loosening the nut $c$ the disk C may be turned in either direction on the bolt D, adjusting it to or from the cutter B, which may be in this manner kept at all times true, and by tightening the nut $c$ the whole is held firmly together. The hub $b$ has a bearing-surface on the bolt D, and also in the disks C and C', and is not apt to wear, and being completely inclosed by the disk is kept free from dirt, and can be readily replaced when worn out.

Having thus described my invention, what I claim as new, and desire to secure by Letters Patent, is—

In a rolling colter, the combination of the cutter B, having hub $b$, socketed disks C C', the latter having projection or stop $e'$, and bolt D, having enlarged portion $d$, and threaded portion provided with nut $c$, with the yoke or standard, substantially as shown and described.

In testimony whereof I affix my signature in presence of two witnesses.

ROBERT KLOSS.

Witnesses:
B. H. CHAPMAN,
DANIEL PALMER.